K. RUSHTON.
MEANS FOR LUBRICATING CLUTCHES.
APPLICATION FILED MAR. 18, 1916.
1,204,194.
Patented Nov. 7, 1916.
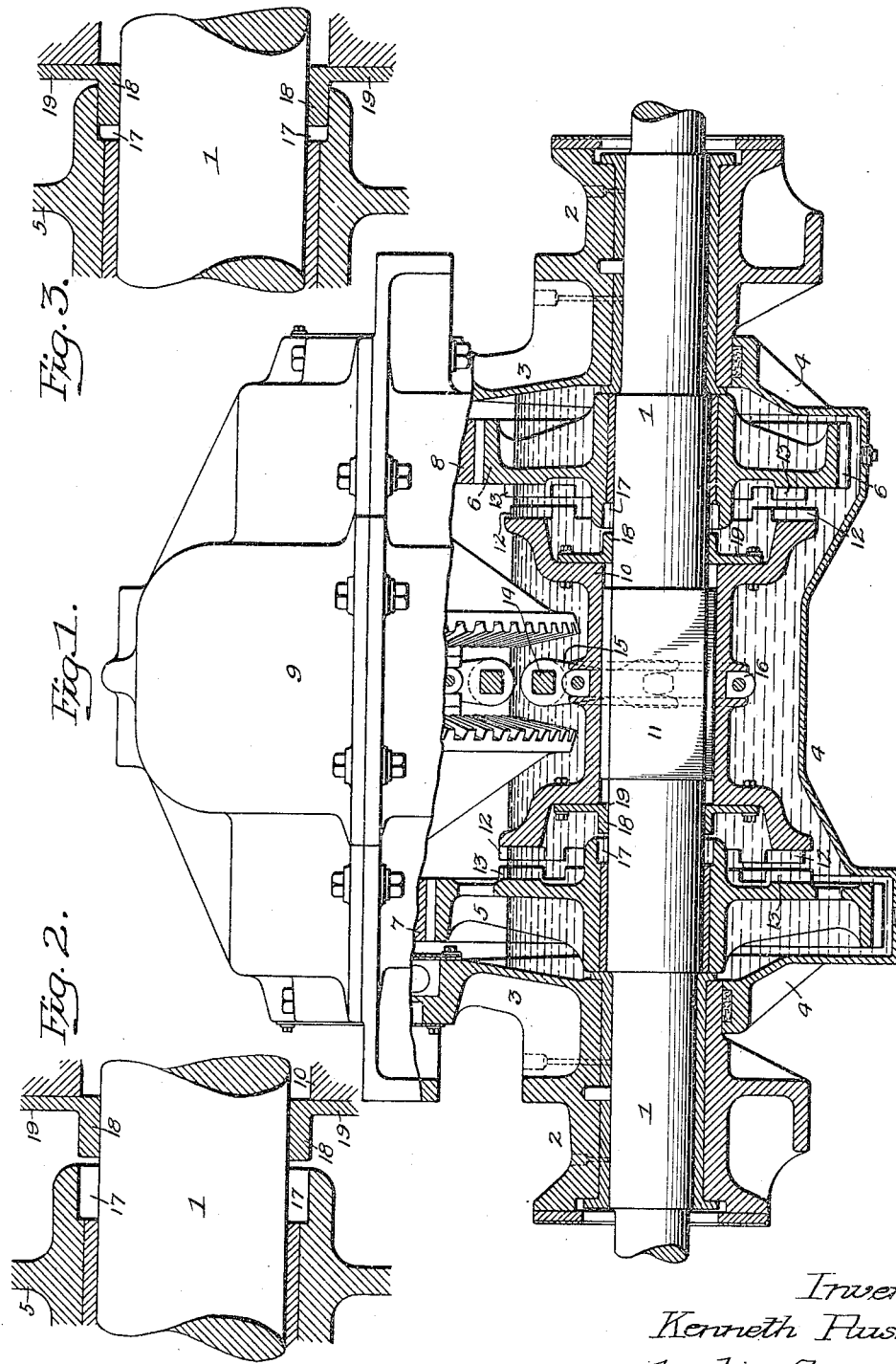
Inventor:-
Kenneth Rushton
by his Attorneys
Howson & Howson

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

MEANS FOR LUBRICATING CLUTCHES.

1,204,194.  Specification of Letters Patent.  Patented Nov. 7, 1916.

Application filed March 18, 1916. Serial No. 85,089.

*To all whom it may concern:*

Be it known that I, KENNETH RUSHTON, a citizen of the United States, residing in Philadelphia, Pennsylvania, have invented certain Improvements in Means for Lubricating Clutches, of which the following is a specification.

My invention relates to certain improvements in clutch mechanism which is inclosed in a casing containing a lubricant.

In the type of clutch mechanism shown the two wheels are spaced apart and are loosely mounted on a shaft while the clutch sleeve slides longitudinally on the shaft and turns therewith, and means are provided for shifting the clutch member into positive connection with either of the said wheels. The great difficulty in clutches of this type, especially those of any size, is to lubricate the bearing of the wheels on the shaft and the object of my invention is to provide for forcing the lubricant into the space between the hub of each wheel and the shaft when the clutch sleeve is shifted longitudinally on the shaft.

While I have described my invention in connection with a double clutch sleeve, which is designed to clutch either of the two wheels, it will be understood that the invention can be used in connection with a single clutch designed to be thrown into and out of engagement with a single wheel.

In the accompanying drawing:—Figure 1 is a view of a clutch mechanism, partly in section, illustrating my invention; Fig. 2 is an enlarged sectional view of a portion of the clutch showing the cavity in the wheel and the plunger on the clutch sleeve in the position illustrated in Fig. 1; and Fig. 3 is a view, similar to Fig. 2, showing the plunger inserted in the cavity.

The particular construction shown in Fig. 1 is a part of an engine transmission used on locomotives or heavy tractors.

Referring to the drawing, 1 is a shaft mounted in bearings 2, which have extensions 3 forming part of the casing inclosing the gearing.

4 is the lower section forming the bottom of the casing and shaped, in the present instance, to conform to the gearing. This casing contains oil, or other suitable lubricant, which extends above the shaft, as shown, so that the shaft and the clutch mechanism are immersed in the lubricant.

5 is one gear wheel at one side of the casing and 6 is another gear wheel at the opposite side of the casing. Both of these gear wheels are loosely mounted on the shaft 1 and the teeth of these gear wheels mesh respectively with the teeth of the wheels 7 and 8 located within the upper section 9 of the casing. Located between the two gear wheels is the clutch sleeve 10 adapted to the squared portion 11 of the shaft so that while this clutch sleeve is free to slide on the shaft it turns with the shaft. On each end of the clutch sleeve are clutch teeth 12, which are arranged to engage teeth 13 on the sides of the gear wheels 5 and 6. The clutch sleeve is moved through a rock shaft 14 by any suitable hand lever and this rock shaft has arms 15 which engage projections on a ring 16 located in an annular groove in the sleeve. This is the ordinary type of connection between a rock shaft and a clutch sleeve.

As illustrated in Figs. 1 and 2, the clutch sleeve is in the central position independent of both wheels 5 and 6. When the sleeve is moved to the left by the rock shaft 14 it is connected to the gear wheel 5 and when it is moved to the right it is connected to the gear wheel 6.

The above described mechanism is common in double faced clutches of this type, but, as above stated, the hubs of the wheels 5 and 6 have extended bearings, as illustrated in Fig. 1, and it is difficult to lubricate this bearing properly, owing to the fact that lubricant will not flow into the space between the hubs of the wheels and the shaft. I overcome this difficulty by forming a cavity 17 in the inner end of the hub of each wheel, as shown in the drawing, and secure to or form integral with the clutch sleeve two plungers 18, which are adapted to enter the cavities 17 in the hubs of the wheels when the sleeve is moved longitudinally on the shaft to allow the clutch to positively engage either one of the wheels. In the present instance, the plungers 18 are mounted on the disks 19 secured to the ends of the sleeve by bolts, but, as hereinbefore stated, they may be formed integral with the sleeve in some types of clutch mechanism.

When the clutch is in the central position, as illustrated in Fig. 1, there is sufficient space between the end of the plunger and the end of the hub of the wheels to allow liquid lubricant to flow into the cavities 17 so that the moment the clutch sleeve is moved longitudinally the plunger enters the cavity and forces the lubricant entrapped therein into the space between the hub and the shaft, thoroughly lubricating the entire bearing surface of the wheel.

It will be understood that the cavity may be of any depth desired, depending entirely upon the type of wheel in which it is located. The plunger can be of any length to correspond with the cavity in the hub of the wheel.

While my invention is shown as applicable to what may be termed a "positive" clutch, in which teeth on the clutch sleeve engage teeth on the wheels, it may be applied to other types of clutches which are immersed in a lubricant without departing from the essential features of the invention.

I claim:

1. The combination in a clutch, of a shaft; a wheel loosely mounted on the shaft and having a cavity in one end of the hub; a clutch sleeve mounted on the shaft and arranged to be moved into contact with the wheel, said sleeve having a plunger adapted to enter the cavity and to force the entrapped lubricant into the bearing between the wheel and the shaft.

2. The combination in clutch mechanism, of a shaft; two hubs loosely mounted on the shaft and spaced apart; a clutch sleeve located on the shaft and arranged to move longitudinally thereon; a plunger on each end of the clutch sleeve; and a cavity in each hub into which the plunger is arranged to enter when the sleeve is moved toward the hub.

3. The combination in clutch mechanism, of a shaft; bearings for the shaft; a casing containing lubricant; two wheels loosely mounted on the shaft and spaced apart and located in the casing; a sleeve mounted to turn on the shaft and located between the two wheels; clutch teeth on each wheel and clutch teeth on the ends of the sleeve arranged to engage the teeth of the wheels; and an annular cavity in the inner end of the hub of each wheel and an annular plunger secured to each end of the sleeve and arranged to enter the cavities in the hubs of the wheels when the clutch sleeve is moved longitudinally on the shaft.

KENNETH RUSHTON.

Copies of this patent may be obtained for five cents each, by addressing the "Commissioner of Patents, Washington, D. C."